United States Patent
Karp

(10) Patent No.: US 7,596,594 B2
(45) Date of Patent: Sep. 29, 2009

(54) SYSTEM AND METHOD FOR DISPLAYING AND ACTING UPON EMAIL CONVERSATIONS ACROSS FOLDERS

(75) Inventor: Daniel Geoffrey Karp, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 818 days.

(21) Appl. No.: 11/202,918

(22) Filed: Aug. 12, 2005

(65) Prior Publication Data

US 2009/0100009 A1 Apr. 16, 2009

Related U.S. Application Data

(60) Provisional application No. 60/606,862, filed on Sep. 2, 2004.

(51) Int. Cl.
*G06F 15/16* (2006.01)
*G06F 17/30* (2006.01)

(52) U.S. Cl. ............... 709/203; 709/204; 709/205; 709/206; 707/1; 707/7; 707/200

(58) Field of Classification Search ......... 709/203–206; 707/1, 7, 200
See application file for complete search history.

(56) References Cited

U.S. PATENT DOCUMENTS

| | | | |
|---|---|---|---|
| 7,035,903 B1 * | 4/2006 | Baldonado | 709/206 |
| 7,469,280 B2 * | 12/2008 | Simpson | 709/223 |
| 2005/0004990 A1 * | 1/2005 | Durazo et al. | 709/206 |
| 2005/0223061 A1 * | 10/2005 | Auerbach et al. | 709/206 |
| 2005/0234850 A1 * | 10/2005 | Buchheit et al. | 707/1 |
| 2006/0031329 A1 * | 2/2006 | Robertson | 709/206 |
| 2006/0053204 A1 * | 3/2006 | Sundararajan et al. | 709/206 |
| 2008/0313292 A1 * | 12/2008 | Forstall et al. | 709/206 |

* cited by examiner

*Primary Examiner*—Nathan J Flynn
*Assistant Examiner*—Joshua Joo
(74) *Attorney, Agent, or Firm*—The Law Office of Deepti Panchawagh-Jain

(57) ABSTRACT

System and method for displaying and/or acting upon email conversations across folders. In one embodiment, email messages are grouped into conversations regardless of the folders in which the messages reside. Such conversations can span multiple folders. In one embodiment, all or some messages from a conversation are displayed, along with the folder associated with each message. In one embodiment, specified actions can be taken upon all messages in a conversation regardless of the folders in which the messages reside. In one embodiment, it can be specified that an action should apply (or not apply) only to messages in select folders, or that the action should apply only to messages matching a search query. Such specifications may be a system-level indication (which may be set by the system developer or administrator) or it may be a user indication (either a default user setting or an explicit user comment).

20 Claims, 10 Drawing Sheets

Grouping email messages into conversations, where such grouping is performed independent of folders in which messages reside, thereby enabling conversations to span multiple folders
110

Displaying a conversation, where for each message in the displayed conversation, the folder associated with such message is identified.
120

Figure 1

SYSTEM AND METHOD FOR DISPLAYING AND ACTING UPON EMAIL CONVERSATIONS ACROSS FOLDERS

RELATED APPLICATIONS

This application claims the benefit of U.S. Provisional Application No. 60/606,862, filed on Sep. 2, 2004, and titled "Email System and Method for Viewing, Searching, Tracking, and Indexing Email," the contents of which are incorporated by reference as if fully disclosed herein.

BACKGROUND ART

1. Field of the Invention

This invention relates generally to electronic mail systems and, more specifically, to displaying and acting upon email conversations across folders.

2. Description of the Background Art

Electronic mail ("email") has become an important means of communication. Many email users have large email mailboxes with numerous messages. Therefore, it is often convenient to group related messages together in order to enable users to automatically view related messages without having to search their mailbox. A grouping of related messages that are considered to be part of a single conversation is often referred to as a "conversation" in the art. An example of a conversation is an initial message and the subsequent replies to or forwards of such message (this is also referred to as an "email thread").

In known email systems (sometimes also referred to as "collaboration suites" when they provide functionality in addition to just email, such as "calendar" and "contacts"), conversations are limited to related email messages within a single folder. In other words, known systems do not enable conversations to span folders in a user's mailbox. It is desirable to enable conversations to span folders, such as in the following example scenario: User #1 receives an email from a customer and forwards it to user #2 to handle. User #1 moves the customer's email to the "trash" folder under the assumption that user #2 is handling the matter. If the customer emails user #1 again regarding the same subject matter, it is convenient for the email user #1 to see the customer's new message and original message automatically grouped together despite being in different folders (the original in "Trash" and the new one in "Inbox"). Known systems do not enable such grouping, but the present invention does.

Also, because known systems do not track conversations across folders, it is not possible to perform an action on a conversation across folders. For instance, if a user has some related email message in different folders, under the known art it is not possible for the user to tag all the messages in that conversation with one command.

It is worth noting that, in Google's current version of its email service "Gmail," it appears that conversations span at least some folders (namely, "Inbox", "Sent Mail" "Drafts," and "Starred"), but this is not the case. Gmail currently has only three folders: "All Mail," "Trash," and "Spam," and Google does not enable conversations to span such folders. Google presents "Inbox," "Sent Items," "Draft," and "Starred" as folders, but these actually are not folders.

Folders are an organizational concept that partition messages in a mailbox so that every message is in one and only one folder. As stated above, in Gmail, the Inbox, Starred, Sent Mail, and Draft "folders" are not folders, Rather, the Inbox "folder" is the search results of all items in the All Mail folder with the label "Inbox", the Starred "folder" is the search results for items in the All Mail folder flagged with a star, the Sent Mail "folder" is the search results for items in the All Mail folder sent by the user, and the Drafts "folder" is the search results for items in the All Mail folder which have not yet been sent. The consequence of that is that a single-message conversation can appear in Gmail's Inbox, Starred, Sent Mail, and Draft "folders" at the same time because such conversation is really just in the "All Mail" folder. However, Google does not enable conversations to span "Inbox" and "Trash" because "Trash" is a separate folder from "All Mail." Similarly, in Gmail, conversations cannot span "Trash" and "Spam" or "All Mail" and "Spam" because these are all separate folders.

SUMMARY OF THE INVENTION

The present invention provides a system and method for displaying and/or acting upon email conversations across folders. In one embodiment, the method comprises: (1) grouping email messages into conversations, where such grouping is performed independent of the folders in which the messages reside, thereby enabling conversations to span multiple folders; and (2) displaying one or more conversations, where, for each message in a displayed conversation, the folder associated with such message is identified. Grouping conversations independent of folders enables a user to easily view or act upon a full email thread, even if a user has moved select messages within a thread to another folder or folders.

In another embodiment of the invention, the method comprises (1) grouping email messages into conversations, where such grouping is performed independent of folders in which messages reside; (2) receiving a command to perform an action on a conversation; (3) performing the action upon all messages in the conversation regardless of the folders in which the messages reside, unless it is specified that the action should apply only to messages in select folders, in which case the action will apply to only those messages in the conversation that are in such select folder, or unless it is specified that the action should apply only to messages matching a search query, in which case the action will apply only to those messages in the conversation matching the specified query. The indication as to which folders the action should apply may be a system-level indication (which may be set by the system administrator) or it may be a user indication (either a default user setting or an explicit user command).

BRIEF DESCRIPTION OF THE DRAWINGS

FIG. 1 illustrates a method for displaying email conversations across folders.

DETAILED DESCRIPTION OF THE PREFERRED EMBODIMENTS

The present invention provides a system and method for displaying and/or acting upon email conversations across folders. FIG. 1 illustrates a method for displaying email conversations across folders. Such a method may be implemented by the combination of (1) an email server application that provides email services to users (such an email application typically runs on a server often referred to as a "mail server"), and (2) an email client application ("email client") through which a user interfaces with the email server application.

The method illustrated in FIG. 1 comprises grouping email messages into conversations, where such grouping is performed independent of folders in which the messages reside, thereby enabling conversations to span multiple folders (step 110). The method also comprises displaying one or more of the conversations, where, for each message in a displayed conversation, the folder associated with such message is identified. In one embodiment, the display includes all messages regardless of the folder in which the message reside, and in another embodiment, messages in select folders, such as the spam folder, may be eliminated from the display.

Figure 8:
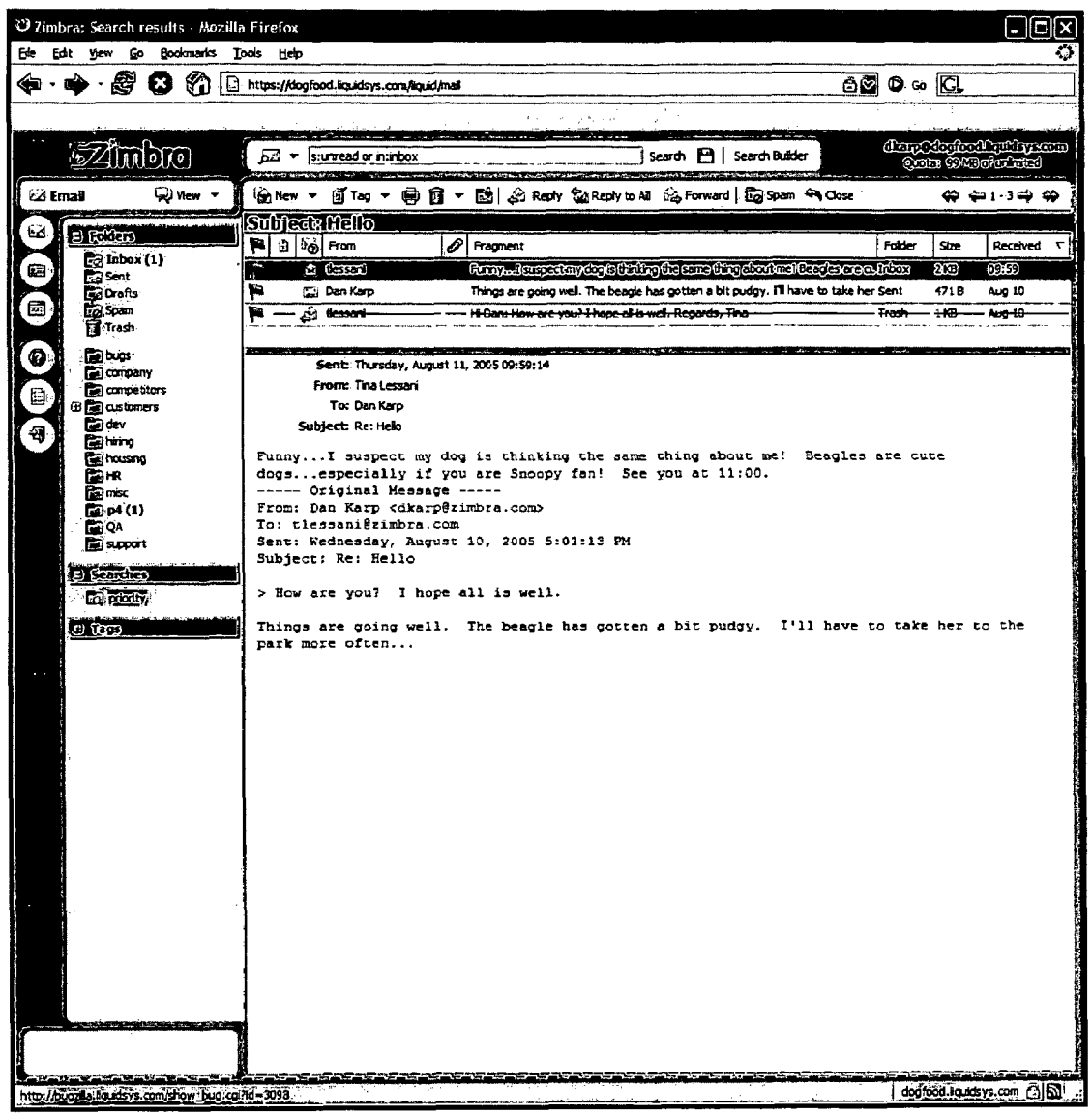
FIGS. 8-10 are screen shots illustrating example applications of the methods described herein.

FIG. 8 illustrates an example of an email client that displays conversations across folders. In this example, the user received a message, replied to it, and moved the original message to the trash. The user then received a subsequent message with the same subject line, and consequently the conversation spans the "Inbox," "Sent," and "Trash" folders.

Figure 2:
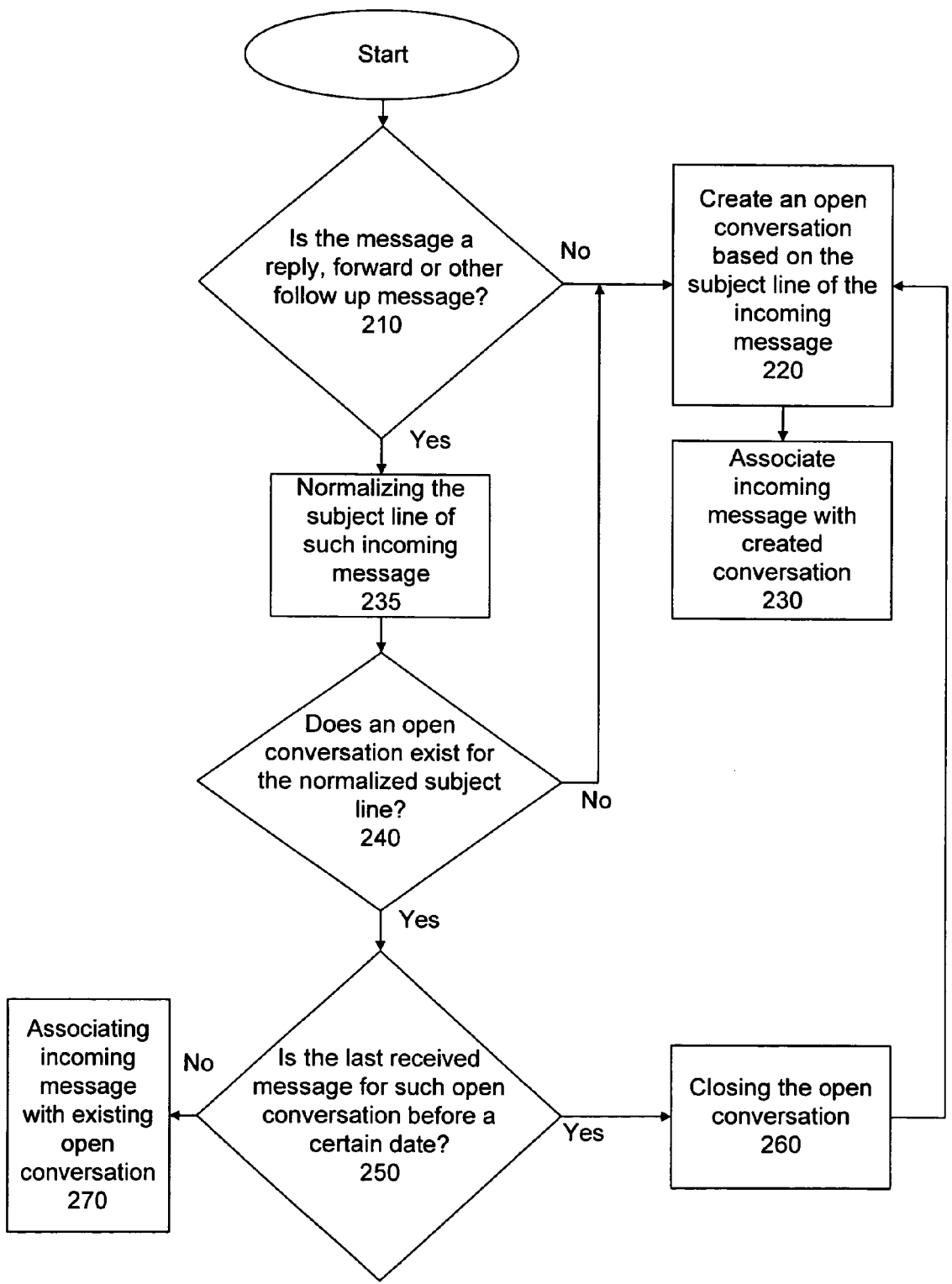
FIG. 2 illustrates a method for grouping email conversations across folders.

FIG. 2 illustrates one way in which email messages may be grouped across folders. According to this method, when an email server application receives a message, it determines whether or not it is a forward, reply, or other type of follow-up message (hereinafter the term "follow-up message" means a forward, reply, and/or other similar type of message) (step 210). The email server application can determine if the incoming message is a follow up message from the subject field in the email message header. If the incoming message is not a follow-up message, the email server application creates an open conversation based on the subject line of the incoming message (step 220), and associates an incoming message with the created conversation (step 230).

In one embodiment, creating an open conversation means creating a unique identifier for the conversation. Such unique identifier is referred to as a "conversation ID" herein. One way to associate an incoming message with a conversation is to persistently store the conversation ID in a message object associated with the message, where the message object is a file that includes summary information about the email message (an example of such summary information is the unread status of the message, the received date, and excerpts from the email message headers).

With respect to the determination in step 210, if the incoming message is a follow-up message, the email server application normalizes the subject line by removing the parts of the subject line that identify the message as a follow-up message (such as "Re:" and "(fwd)") (step 235). The email server application then determines whether or not an open conversation already exists for the normalized subject line (step 240). If an open conversation does not exist for the normalized subject line, the email server application creates an open conversation for such normalized subject line and associates the incoming message with the created conversation (steps 220, 230). An example of when this scenario would arise is when user #1 emails user #2, user #2 replies to user #1 and copies user #3. The message received by user #3 would be a follow-up message that is not associated with an existing open conversation.

If an open conversation exists for the normalized subject line, the email server application determines how recently the last received message in the conversation was received (step 250). The rationale behind this is that, if the last-received messages is more than x many days old (where x can be any positive number—in one implementation it is 31), it likely corresponds to a different email conversation than the incoming message. If the last received message was received prior to a certain date, the email server application closes the existing conversation, and creates a new conversation for the incoming message (as described with respect to steps 220 and 230).

If the last-received message in the existing conversation was received after the specified date (meaning is fairly recent), then the email server application associates the incoming message with the existing open conversation (step 270). In an alternate embodiment, between steps 250 and 270, the email server application compares header information (i.e., email metadata) in the incoming message with header information in the last-received message in the existing conversation. For instance, the email server application might compare the Message-ID and References headers of each message to see if they correspond. In this alternate embodiment, if a comparison of the header information indicates the messages are likely related, then the email server application associates the incoming message with the existing open conversation. Otherwise, it creates a new conversation for the incoming messages (as described with respect to steps 220 and 230).

Figure 3:
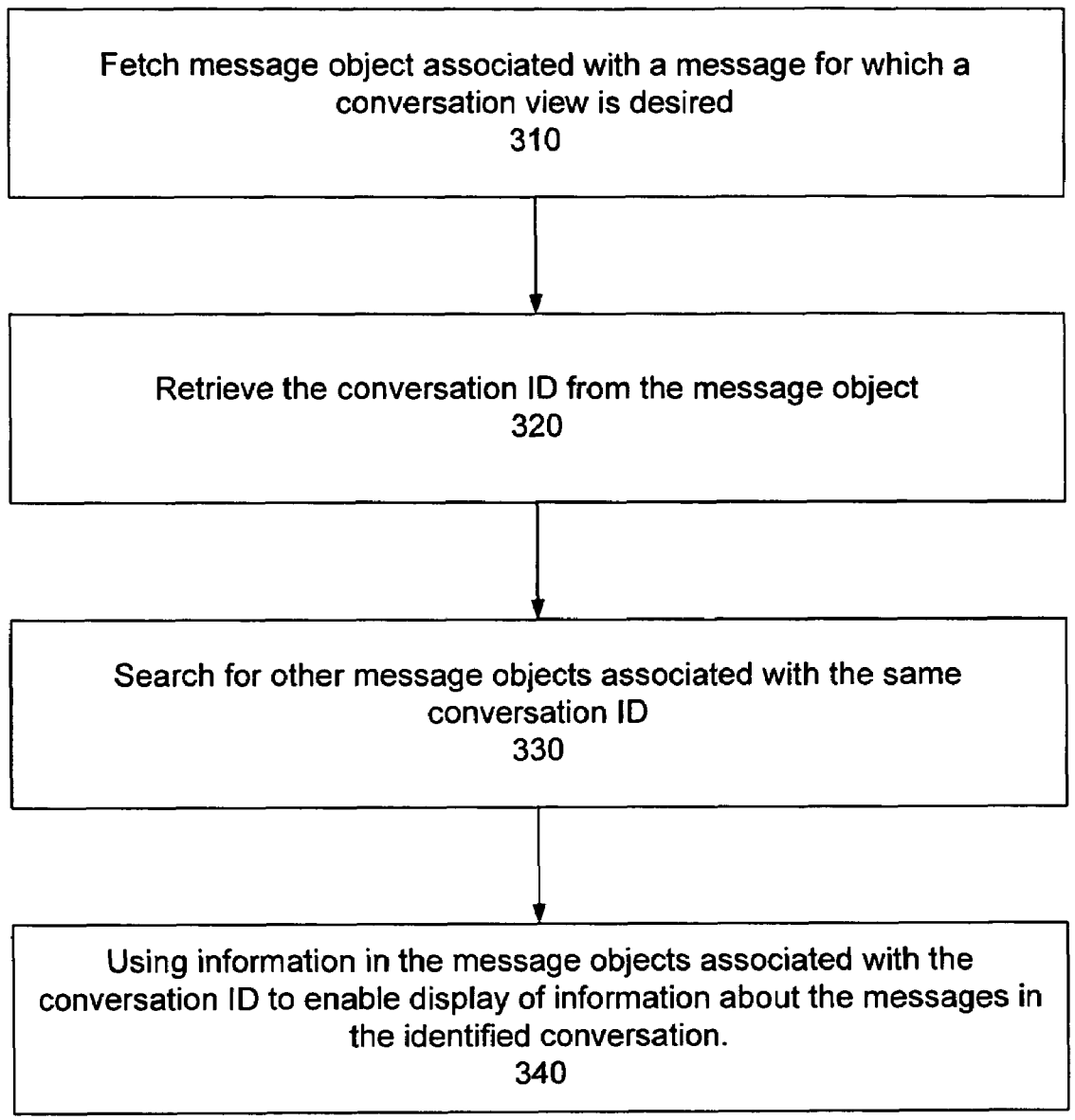
FIG. 3 illustrates a method for displaying email conversations.

FIG. 3 illustrates one way in which an email server application can enable display of conversations (i.e., one way in which step 120 in FIG. 1 can implemented). The email server application fetches a message object associated with a message for which a conversation view is desired (step 310). As stated above, a message object includes summary information about a message, including a field for a conversation ID. The email server application then retrieves the conversation ID from the message object (step 320) and searches for other message objects having the same conversation ID (step 330). Information in the message objects is then used to enable an email client to display information about the messages in the identified conversation (step 340). In an alternate embodiment, information about messages in each conversation is cached by the email client, and, instead of steps 330 and 340, the email client application retrieves the cached information and uses the cached information to display the conversation view.

Figure 4:
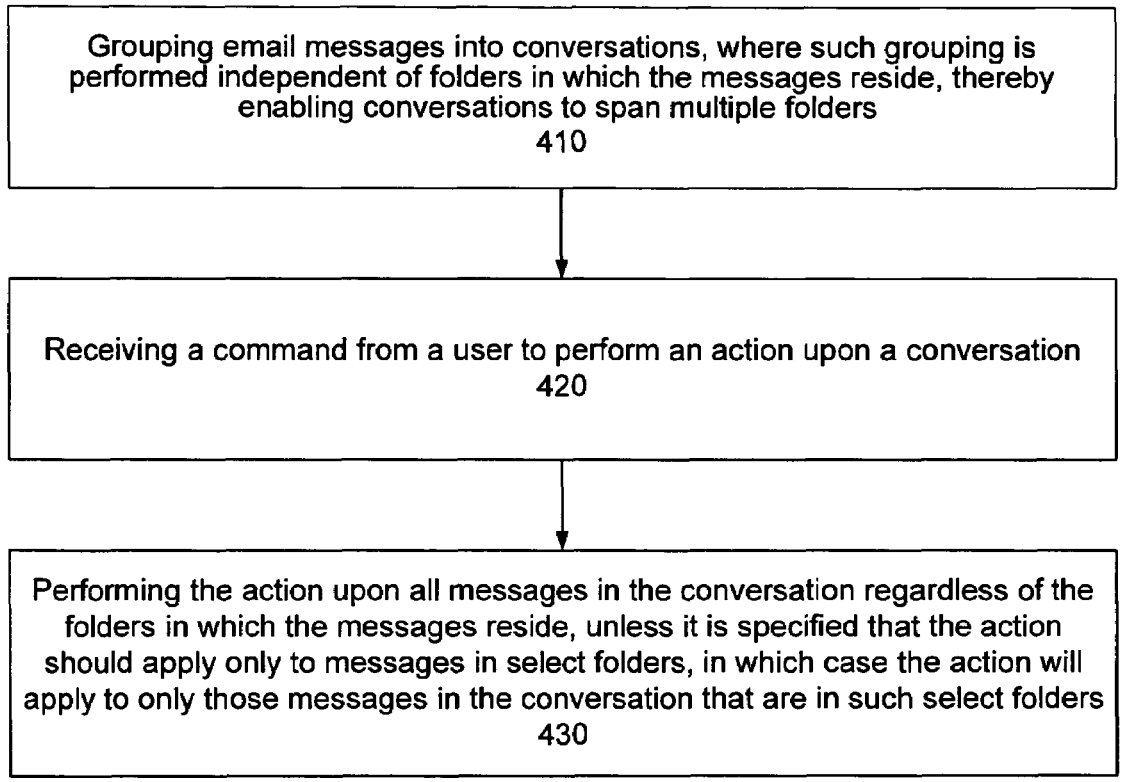
FIG. 4 illustrates a method for performing an action upon a conversation across folders.

In one embodiment of the present invention, a user may perform an action upon a conversation and have the action apply to the entire conversation or only to messages in selected folders in the conversation. As illustrated in FIG. 4, in this embodiment, an email server application groups email messages into conversations, where such grouping is performed independent of folders in which the messages reside, thereby enabling conversations to span multiple folders (step 410). In response to receiving (via an email client) a command from a user to perform an action upon a conversation (step 420), the email server application performs the actions upon all messages in the conversation regardless of the folders in which the messages reside, unless it is specified that the action should apply only to messages in select folders, in which case the action will apply to only those messages in the conversation that are in such select folders (step 430). The indication as to which folders the action should apply may be a system-level indication (which may be set by the system developer or administrator) or it may be a user indication (either a default user setting or an explicit user command). Having conversations that are independent of folders allows the system developer, system administrator, and/or user maximum flexibility to determine on a case-by-case basis whether the action will apply to the conversation across all folders or just select folders.

Figure 9:
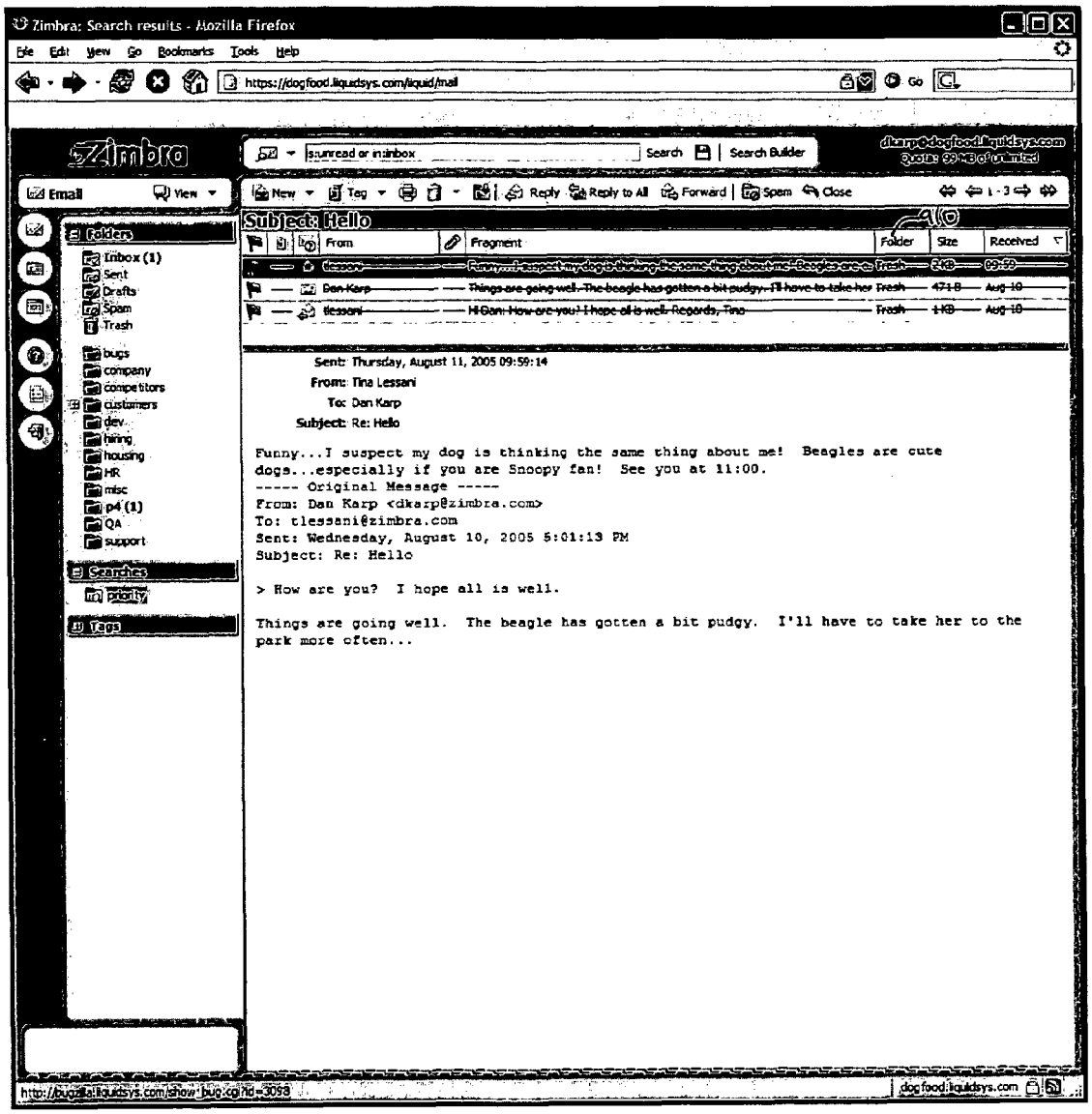

FIG. 9 illustrates the conversation in FIG. 8 after the user has moved the conversation to the "Trash" folder. In this case, the folder column 910 indicates that all messages in the conversation are now in the "Trash" folder.

Figure 5:
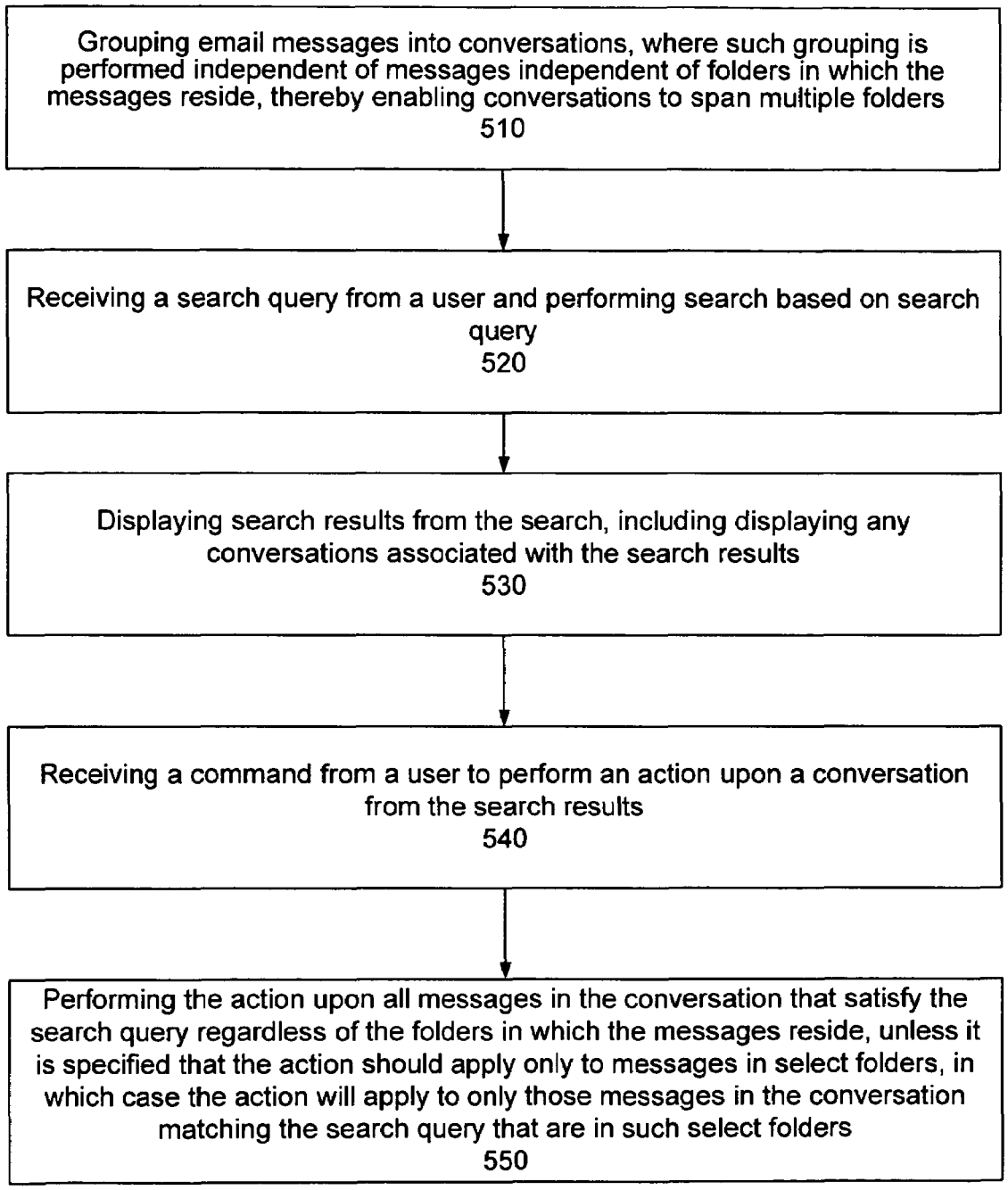
FIG. 5 illustrates a further embodiment for performing an action upon a conversation across folders.

FIG. 5 illustrates a further embodiment in which a user may perform an action upon a conversation. The email server application groups email messages into conversations, where such grouping is performed independent of folders in which the messages reside, thereby enabling conversations to span more than multiple folders (step 510). The email server application receives a search query from a user (via an email client) and performs a search based on the search query (step 520). The email server application then provides the search results to the applicable email client, which displays the search results, where the display includes conversations associated with the search results (step 530). In response to the email server application receiving a request from a user to perform an action upon a conversation (step 540), the email server application performs the action on all messages in the conversation that satisfy the search query regardless of the folders in which the messages reside, unless it is specified that the action should apply only to messages in select folders, in which case the action will apply to only those messages in the conversation matching the search query that are in such select folders (step 550). As stated above, the indication as to which folders the action should apply may be a system-level indication (which may be set by the system developer or administrator) or it may be a user indication (either a default user setting or an explicit user command).

Figure 6:
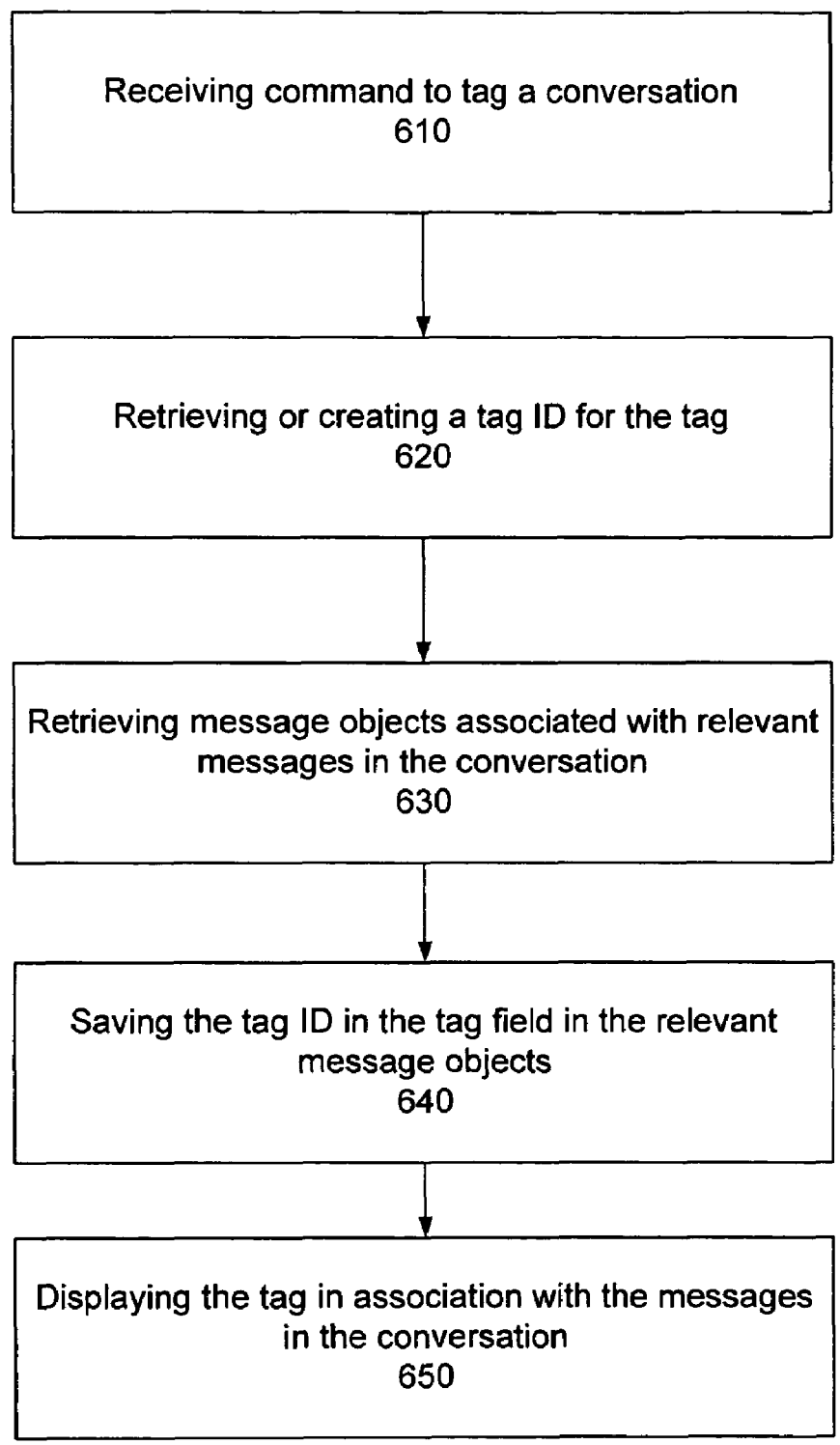
FIG. 6 illustrates an example of the method for performing an action upon a conversation.
Figure 10:
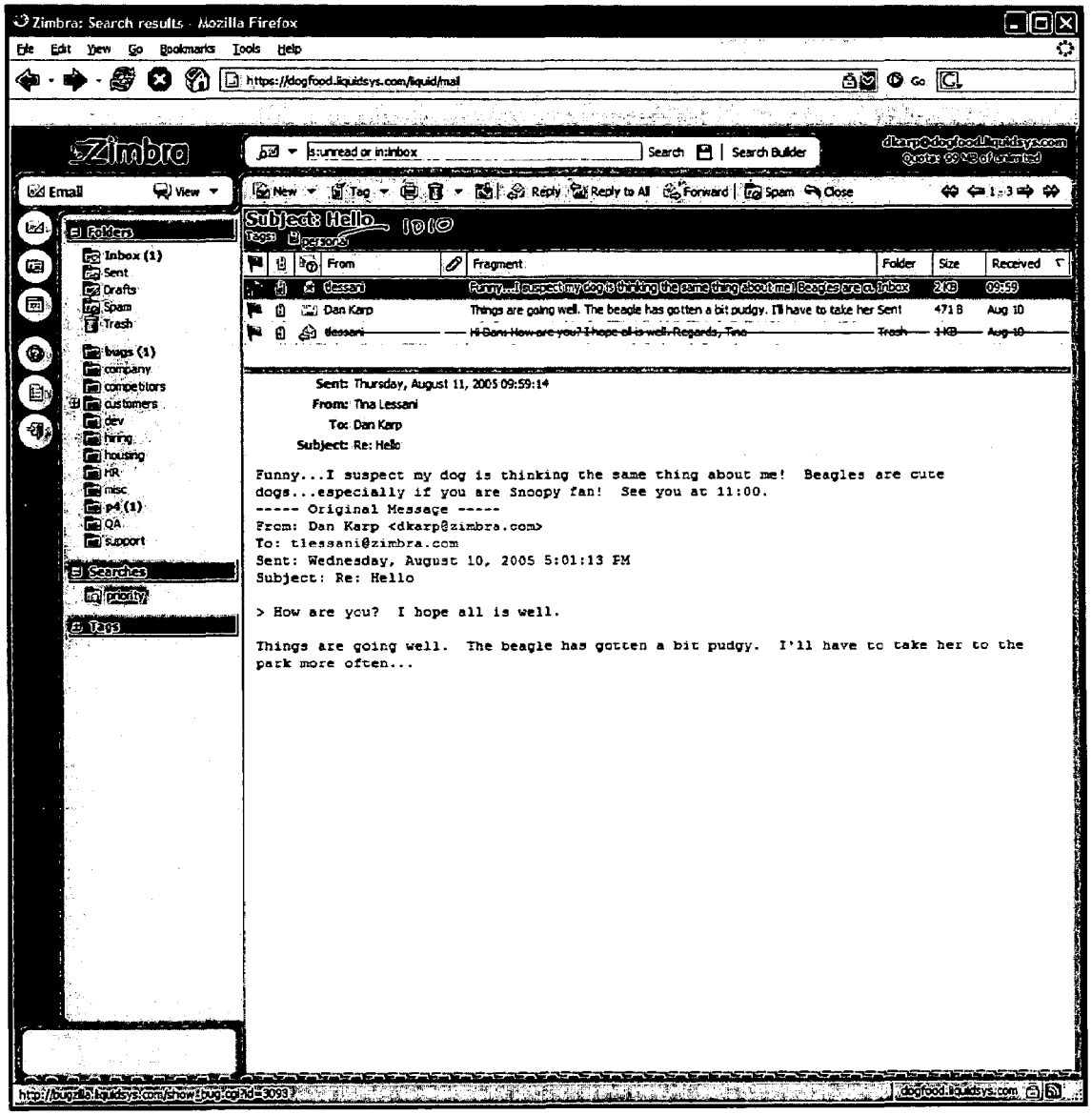

FIG. 6 illustrates an example of a method for performing an action on a conversation. In this example, the email server application receives a command to tag a conversation (step 610). The email server application then retrieves or creates a tag ID for the tag (step 620). The email server application retrieves the relevant message objects associated with messages in the conversation (step 630). The relevant message objects may be the message objects for (1) all messages in the conversation, (2) messages in the conversation in select folders, or (3) messages in the conversation satisfying a search result. The email server application saves the tag ID in the relevant message objects (step 640), and the applicable email client displays the tags in association with all the relevant messages in the conversation (step 650). FIG. 10 illustrates an example of the result when a user tags the conversation illustrated in FIG. 9 with a tag 1010 labeled "Personal".

Figure 7:
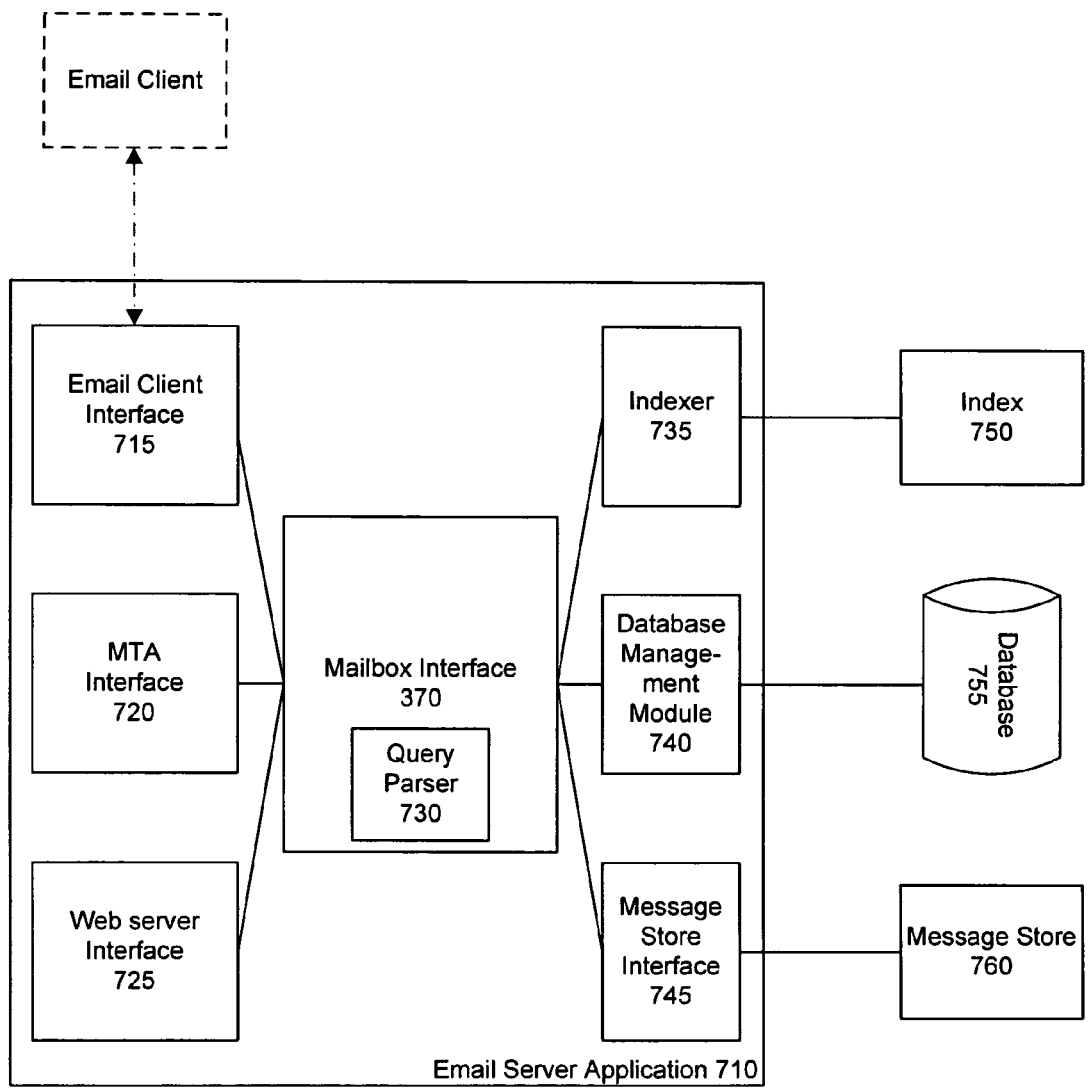
FIG. 7 is a block diagram of an example email application of the present invention.

FIG. 7 is a block diagram of an example email server application for implementing the methods described herein. Such email server application can be implemented in various ways, and the embodiment discussed with respect to FIG. 7 is just an example of one such implementation. The illustrated email server application executes on a server, and email users access mailbox information stored by the illustrated email server application through email client applications.

For ease of explanation, the email server application 710 can be thought of as divided into various functional modules, which are depicted in FIG. 7. These modules are a Mailbox Interface 770, a Query Parser 730, an Indexer 735, a Database Management Module 740, a Message Store Interface 745, an MTA Interface 720, an Email Client Interface 715, and a Web Server Interface 725. In one embodiment these modules are coded in Java. Those skilled in the art will appreciate that an email server application will include additional functionality not represented by the above modules (such as functionality related to security, user management, global address lists, etc.). Such functionality is well known in the art.

The Database Management Module 740 is a set of routines for managing, storing and retrieving information in a relational Database 755 (e.g. MySQL). The Database 755 includes information about each provisioned email user's mailbox that is used to generate a view of the user's mailbox. It contains a listing of the contents of a user's mailbox (with a reference to the actual storage location of the messages in the Message Store 760), and it includes mutable information about such content, such as which folder each message resides (inbox, sent items, user-created folders, etc.) or which messages have been read. In one embodiment, the Database 755 is where message objects associated with messages are stored, where each message object includes summary information (i.e., metadata) about the email message to which it correspond.

The Message Store Interface 745 is software for storing and retrieving email messages in a Message Store 760. The Message Store (often referred to as the "Blob Store" in the industry) stores the actual email messages, including any attachments embedded within email messages. Techniques for storing and retrieving email messages, as well as storing and retrieving user-specific mailbox information to generate a view of a user's mailbox are well known in the art.

The Indexer 735 indexes email messages based on the content of the messages and on the metadata in the headers of the email messages. The Indexer also may index email attachments based on content and metadata. The Indexer 735 stores the indexes in Index 750. The Indexer 735 also stores a copy of some of the static metadata in the Index 750. In an alternate embodiment, the functionality of the Indexer 335 and the Database Management Module 740 are combined, and the indexes and user mailbox information are stored in one database.

The Web Server Interface 725 is the interface through which the email server application 710 communicates with web servers. In one embodiment, the Web Server Interface 725 provides the initial page of an email client application presented to the user. In one embodiment, such initial page provides JavaScript code, which is downloaded into a user's browser to become the email client application.

The Email Client Interface 715 is the interface through which the email server application 710 communicates with email client application. In one embodiment, the Email Client Interface 715 supports the industry-standard POP and IMAP protocols as well as a SOAP protocol.

The MTA Interface 720 receives incoming messages for provisioned users (i.e., users who have mailboxes with the email application 710) from a Mail Transfer Agent (MTA) (not shown). In one embodiment the MTA uses the Local Mail Transfer Protocol (LMTP) to communicate with an MTA Interface 720 that uses the Simple Mail Transfer Protocol (SMTP). The MTA forwards incoming email message to the Mailbox Interface 770.

The Mailbox Interface 770 processes incoming email messages, including parsing the email message headers for metadata. The Mailbox Interface 770 sends the message and metadata to the Indexer 735, Database Management Module 740, and Message Store Interface 745, as applicable. In one embodiment, the Mailbox Interface 770 performs the method described with respect to FIG. 2 for grouping email messages. In such embodiment, the Mailbox Interface also instructs the Database Management Module to perform steps 310-320 in FIG. 3, and provides the resulting conversation information to the Email Client Interface 715 to enable email client applications to display the conversation.

The Mailbox Interface 770 includes a Query Parser 730, which parses all requests that involve searching the Index 750 or the Database 755. In response to receiving such requests, the Query Parser 730 creates appropriate query trees and sends them to the Indexer 735 and/or the Database Management Module 740, depending on whether or not the Index 750 or the Database 755 have the appropriate information. The Query Parser 730 receives, and if necessary, assembles the responses to the query trees from the Indexer 735 and Database Management Module 740 and forwards it to the appropriate interface (such as the Email Client Interfaces 315) for transmittal to the requesting systems.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for displaying an email conversation across folders comprising:
   grouping email messages into conversations, where the grouping is performed independent of folders in which the messages reside, thereby enabling conversations to span multiple folders; and
   displaying at least one of the conversations, the at least one of the conversations including a plurality of messages, where, for each of the plurality of messages in the at least one displayed conversation, a folder associated with each of the plurality of messages is identified,
   wherein grouping email messages into conversations comprises:
   determining from a subject line of an incoming message whether the incoming message is a follow-up message;
   in response to the incoming message not being a follow-up message, creating an open conversation based on the subject line of the incoming message and associating the incoming message with the created open conversation;
   in response to the incoming message being a follow-up message, normalizing the subject line of the incoming message and determining whether or not an open conversation exists for the normalized subject line;
   in response to an open conversation not existing for the normalized subject line, creating a new open conversation for the normalized subject line and associating the incoming message with the new open conversation; and
   in response to an open conversation existing for the normalized subject line, associating the incoming message with the existing open conversation, and
   wherein determining whether or not an open conversation exists for a normalized subject line comprises:
   in response to there being an open conversation corresponding to the normalized subject line, determining whether or not the a last-received message in the open conversation was received before a certain date;
   in response to determining that the last-received message was received before the certain date, closing the open conversation and determining that an open conversation does not exist for the normalized subject line;
   in response to determining that the last-received message was received after the certain date, comparing header information in the incoming message with header information in the last received message in the open conversation to determine whether similarities in the header information indicates the incoming message and the last-received message are related;
   in response to determining the incoming message and the last-received message in the open conversation are related, determining that an open conversation exists for the normalized subject line; and
   in response to determining that the incoming message and the last received message in the open conversation are not related, closing the open conversation and determining that an open conversation does not exist for the normalized subject line.

2. The method of claim 1, wherein displaying at least one of the conversations including the plurality of messages comprises:
   fetching a message object associated with one of the plurality of messages where the message object includes summary data about the one of the plurality of messages;
   identifying from the message object the at least one of the conversations associated with the one of the plurality of messages;
   performing a search for other message objects associated with the identified at least one of the conversations, where the search is performed across multiple folders in which the plurality of messages reside; and
   using information in the message object and the other message objects associated with the identified one of the conversations to enable display of information about the messages in the identified least one of the conversations.

3. The method of claim 1, wherein displaying at least one of the conversations including the plurality of messages comprises:
   fetching a message object associated with one of the plurality of messages where the message object includes summary data about the one of the plurality of messages;
   identifying from the message object the at least one of the conversations associated with the one of the plurality of messages;
   retrieving cached information related to the plurality of messages in the identified conversation; and
   using the cached information to enable display of information about the plurality of messages in the identified conversation.

4. The method of claim 1, wherein the display of the at least one conversation includes all of the plurality of messages in the at least one conversation, regardless of folders in which the plurality of messages reside.

5. The method of claim 1, wherein the display of the at least one conversation includes all of the plurality of messages in the at least one conversation except for a subset of the plurality of the messages in folders related to trash or spam.

6. The method of claim 1, wherein the display the at least one conversation includes all of the plurality of messages in the at least one conversation that satisfy a search query.

7. The method of claim 1, wherein the display of the at least one conversation includes all of the plurality of messages in the at least one conversation that satisfy a search query, except for a subset of the plurality of the messages in folders related to trash or spam.

8. A method for performing an action upon an email conversation comprising:
   grouping a plurality of email messages into a plurality of conversations, where the grouping is performed independent of folders in which the plurality of email messages reside, thereby enabling the plurality of conversations to span multiple folders;

receiving an indication from a user to perform an action upon a conversation of the plurality of conversations comprising a subset of the plurality of email messages; and performing the action upon the conversation of the plurality of conversations, wherein the action is applied to all email messages in the subset of the plurality of email messages in the conversation of the plurality of conversations regardless of the folders in which the subset of the plurality of email messages reside, unless the indication from the user includes an instruction that the action should apply only to a smaller subset of email messages in the subset of the plurality of email messages in select folders, in which case the action will apply to only the smaller subset of the email messages of the conversation in the select folders.

9. The method of claim 8, where a system default specifies to which folders to apply the action.

10. The method of claim 8, wherein a user preference specifies to which folders to apply the action.

11. The method of claim 8, wherein an explicit user action specifies to which folders to apply the action.

12. The method of claim 8, wherein performing the action comprises:

for all messages in the conversation that are in folders to which the action applies,
retrieving message objects associated with the messages; and
modifying the message objects associated with the messages to reflect the action.

13. The method of claim 8, wherein the action is moving the conversation to a select folder.

14. The method of claim 8, wherein the action is tagging the conversation.

15. The method of claim 8, wherein the indication from the user includes an instruction that the action apply to messages in the conversation associated with one of the following folder options:

all folders in the conversation;
all folders in the conversation except for folders associated with trash and spam; and
all folders in the conversation except for folders associated with trash, spam, and sent items.

16. The method of claim 8, wherein grouping email messages into conversations comprises:

normalizing a subject of an incoming message;
determining whether or not an open conversation exists for the normalized subject;
in response to an open conversation not existing with respect to the normalized subject, creating a new open conversation for the normalized subject and associating the incoming message with the new open conversation; and
in response to an open conversation existing for the normalized subject, associating the incoming message with the existing open conversation.

17. A method for performing an action upon an email conversation comprising:

grouping a plurality of email messages residing in a plurality of folders into a plurality of conversations, where the grouping is performed independent of the plurality of folders in which the plurality of email messages reside, thereby enabling the plurality of conversations to span multiple of the plurality of folders;
receiving a search query from a user;
performing a search for a subset of the plurality of email messages satisfying the search query;
displaying search results from the search, including a subset of the plurality of conversations including the subset of the plurality of email messages satisfying the search query;
receiving an indication from the user to perform an action upon at least one of the subset of the plurality of conversations; and
performing the action upon the at least one of the subset of the plurality of conversations, wherein the action is applied to all messages in the at least one of the subset of the plurality of conversations satisfying the search query regardless of the plurality of folders in which all messages in the at least one of the subset of the plurality of conversations reside unless the indication from the user includes an instruction that the action should apply only to messages in select ones of the plurality of folders, in which case the action will apply to only a subset of the plurality of messages in the at least one of the subset of the plurality of conversations satisfying the search query that are in the select ones of the plurality of folders.

18. The method of claim 17, wherein the action is moving the at least one of the subset of the plurality of conversations to a select folder.

19. The method of claim 17, wherein grouping email messages into conversations comprises:

normalizing a subject of an incoming message;
determining whether or not an open conversation exists for the normalized subject;
in response to an open conversation not existing with respect to the normalized subject, creating a new open conversation for the normalized subject and associating the incoming message with the new open conversation; and
in response to an open conversation existing for the normalized subject, associating the incoming message with such existing open conversation.

20. The method of claim 17, wherein the action is tagging the at least one of the subset of the plurality of conversations.

* * * * *

UNITED STATES PATENT AND TRADEMARK OFFICE
CERTIFICATE OF CORRECTION

PATENT NO.         : 7,596,594 B2
APPLICATION NO. : 11/202918
DATED              : September 29, 2009
INVENTOR(S)        : Daniel Geoffrey Karp Page 1 of 1

It is certified that error appears in the above-identified patent and that said Letters Patent is hereby corrected as shown below:

In column 7, line 59, in Claim 1, delete "the a" and insert -- a --, therefor.

In column 8, line(s) 28-30, in Claim 2, delete "using information in the message object and the other message objects associated with the identified one of the conversations to enable display of information about the messages in the identified least one of the conversations." and insert -- using information in the message object and the other message objects associated with the identified at least one of the conversations to enable display of information about the messages in the identified at least one of the conversations. --, therefor.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,596,594 B2  Page 1 of 1
APPLICATION NO. : 11/202918
DATED : September 29, 2009
INVENTOR(S) : Daniel Geoffrey Karp It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Fourteenth Day of December, 2010

David J. Kappos
*Director of the United States Patent and Trademark Office*